United States Patent [19]

Allen et al.

[11] 4,007,785

[45] * Feb. 15, 1977

[54] HEATED MULTIPLE SOLVENT METHOD FOR RECOVERING VISCOUS PETROLEUM

[75] Inventors: Joseph C. Allen, Bellaire; Charles D. Woodward, Houston; Alfred Brown, Houston; Ching H. Wu, Houston, all of Tex.

[73] Assignee: Texaco Inc., New York, N.Y.

[ * ] Notice: The portion of the term of this patent subsequent to May 4, 1993, has been disclaimed.

[22] Filed: Mar. 1, 1974

[21] Appl. No.: 447,106

[52] U.S. Cl. .............................. 166/263; 166/274; 166/305 R

[51] Int. Cl.$^2$ ........................................ E21B 43/24

[58] Field of Search .................. 166/272–274, 166/303, 305 R, 263

[56] References Cited

UNITED STATES PATENTS 3,954,141   5/1976   Allen et al. .................... 166/305 R

*Primary Examiner*—Ernest R. Purser
*Attorney, Agent, or Firm*—T. H. Whaley; C. G. Ries; Jack H. Park

[57] ABSTRACT

Viscous petroleum may be recovered from viscous petroleum-containing formations including tar sand deposits by contacting the formation with a heated multiple-component solvent for the petroleum. At least one solvent component is normally gaseous material such as methane, ethane, propane or butane and at least one component is normally liquid, such as pentane and higher molecular weight hydrocarbons. The solvent mixture is heated to a temperature in excess of ambient temperature, and preferably from 100° to 500° F. prior to injection into the formation. The multiple solvent is introduced under sufficient pressure that it is substantially all liquid at the injection conditions. Recovery of petroleum and solvent may be from the same well as is used for injection or from a remotely located well. When the pressure in a portion of the formation contacted by the solvents is reduced below the bubble point pressure of the solvent-bitumen solution, the solvents vaporize to provide a solution gas oil recovery mechanism. The normally liquid components dissolve in the petroleum and reduce the petroleum viscosity.

21 Claims, No Drawings

HEATED MULTIPLE SOLVENT METHOD FOR RECOVERING VISCOUS PETROLEUM

BACKGROUND OF THE INVENTION

I. Field of the Invention

This invention is concerned with a method for recovery of petroleum from viscous petroleum-containing formations including tar sand deposits, and more particularly is concerned with an improved heated multiple-component solvent flooding technique especially useful in viscous petroleum-containing formations including tar sand deposits.

II. Description of the Prior Art

There are many subterranean petroleum-containing formations in various parts of the world from which petroleum cannot be recovered by conventional means because the petroleum is too viscous to flow or be pumped. The most extreme example of viscous petroleum-containing formations are the so-called tar sand or bituminous sand deposits. The largest and most famous such formation is the Athabasca Tar Sand Deposit in the northeastern part of the Province of Alberta, Canada, which contains over 700 billion barrels of petroleum. Other extensive deposits are known to exist in the western United States and Venezuela, and smaller deposits exist in Europe and Asia.

Tar sands are defined as sand saturated with a highly viscous crude petroleum material not recoverable in its natural state through a well by ordinary production methods. The petroleum constituent of tar sand deposits are highly bituminous in character. The sand present in tar sand deposits is generally fine quartz sand coated with a layer of water, with the bituminous petroleum material occupying most of the void space around the water wetted sand grains. The balance of the void space is filled with connate water, and some deposits contain small volumes of gas such as air or methane. The sand grains are packed to a void volume of about 35 percent, which corresponds to 83 percent by weight sand. The balance of the material is bitumen and water, and the sum of bitumen and water is fairly consistantly 17 percent by weight, with the bitumen portion thereof varying from about 2 percent to about 16 percent. One of the characteristics of tar sand deposits which differs considerably from conventional petroleum-containing formations is the absence of a consolidated material matrix within the formation. The sand grains are usually in contact although uncemented and the bitumen occupies most of the void space. The API gravity of the bitumen ranges from about 6 to about 8, and the specific gravity at 60° F. is from about 1.006 to about 1.027. Generally around 50 percent of the bitumen is distillable without cracking. The bituminous petroleum from tar sand deposits is so viscous that some on-site refining of the produced petroleum must be undertaken if the material is to be pumped in an unheated pipeline.

The methods for recovering bituminous petroleum from tar sand deposits include strip mining and in situ separation processes. Most of the recovery to date has been by means of strip mining, although this is economically feasible only when the ratio of overburden thickness to tar sand deposit thickness is around 1 or less. Vast quantities of petroleum are known to exist in the form of tar sand deposits which are not within a range which is economically suitable for strip mining, and so there is a serious need for some form of in situ process wherein the bitumen or bituminous petroleum is separated from the sand by some means and recovered therefrom through a well or other production means drilled into the tar sand deposit.

In situ recovery processes described in the literature are categorized as thermal techniques, including fire flooding and steam flooding, and emulsification drive processes. To be successful, an in situ separation process must accomplish two functions: the viscosity of the viscous crude oil must be reduced and sufficient driving energy to induce movement of the crude oil must be supplied. Emulsification processes frequently employ steam plus a basic material such as sodium hydroxide which induces formation of an oil-in-water emulsion having a viscosity substantially lower than the viscosity of the formation petroleum. Thermal processes are restricted to formations having sufficient overburden thickness to permit injection of high pressure fluids such as steam. Many tar sand deposits exist in which the overburden thickness is too thin for thermal flooding and too thick for strip mining.

One possible process for recovering bitumen from tar sand deposits which does not require the presence of sufficient overburden thickness to contain high pressures is solvent flooding. Solvent flooding involves injection of a solvent into the tar sand deposit, which solvent dilutes and reduces the viscosity of the bituminous petroleum to render it mobile and recoverable by means of a well as is normally employed in conventional oil recovery operations. Although many solvents including aromatic hydrocarbons such as benzene, toluene and xylene, as well as carbon tetrachloride or carbon disulfide, readily dissolve bituminous petroleum, these materials are expensive and since huge quantities are required, solvent flooding has not been considered to be economically feasible. Paraffinic hydrocarbons such as propane, butane, pentane, etc. are more readily available and less expensive than aromatic solvents, but it has always been uniformly believed by persons skilled in the art that paraffinic hydrocarbon solvents could not be used in bituminous petroleum containing formations because of the danger of precipitating asphaltenes which would cause plugging of formation flow channels. Indeed, the asphaltic constituents of crude oil are frequently defined as pentane insoluble materials and deasphalting refinery feed stocks by use of paraffinic hydrocarbons is a commonly used process.

It can be seen from the foregoing that there is a substantial need for a method for recovering viscous petroleum such as bitumen or bituminous petroleum from a tar sand formation by use of readily available inexpensive solvents that can be used in intermediate depth deposits as well as in deep deposits.

SUMMARY OF THE INVENTION

We have discovered, and this constitutes our invention, that viscous petroleum including bitumen may be recovered from viscous petroleum-containing formations including tar sand deposits by injecting into the formation a heated mixture of hydrocarbon solvents. At least one component of the solvent mixture must be normally liquid and at least one component must be normally gaseous. Suitable materials for the normally gaseous solvents include methane, ethane, propane, and butane, as well as ethylene, propylene and butylene. Suitable normally liquid hydrocarbon solvents are pentane, hexane, heptane, and higher molecular weight compounds as well as aromatic hydrocarbons. For example, a mixture of propane and pentane is a very desirable combination for recovering bitumen from a subsurface tar sand deposit. A mixture of crude propane and natural gasoline comprises an especially preferred combination. The multi-component solvent is heated prior to injection to increase the bubble point pressure of the mixture, and so increases the drive energy available for recovering viscous petroleum. Production of viscous petroleum or bitumen occurs when the pressure in a portion of the reservoir contacted by the heated solvent mixture is reduced to a value below the bubble point pressure of the mixture, causing the normally gaseous solvent to break out of solution and display a solution of normally liquid solvent and crude oil in a fashion similar to the primary recovery method referred to as solution gas drive. Production may be taken from a remotely located well or from the same well as was used for injecting the solvent. Surprisingly, the use of paraffinic hydrocarbons such as pentane in application of this process to tar sand materials does not appear to cause formation plugging due to precipitation of asphaltic materials.

DESCRIPTION OF THE PREFERRED EMBODIMENTS

I. The Process

The process of our invention comprises a non-aqueous fluid injection operation necessitating at least one well drilled into and in fluid communication with the petroleum formation. An effective solvent mixture for the particular viscous petroleum or bitumen to which the process is to be applied, is heated and then injected via the injection well. The solvent mixture contains at least one component which is normally gaseous and at least one component which is normally liquid. The solvent mixture is heated to a temperature in excess of ambient temperature in order to increase the bubble point pressure of the solvent in order to increase the drive energy available for oil recovery. Heating of the solvent also enhances the petroleum viscosity reduction effect.

By a normally gaseous solvent, we mean, for the purpose of this application, a material which is gaseous at atmospheric pressure and standard temperature (75° F.). Similarly, a normally liquid substance is liquid at atmospheric pressure and 75° F.

The mixture of the normally liquid and normally gaseous hydrocarbon solvent is heated to the desired temperature and injected into the formation at a pressure above the bubble point of the heated mixture, so that substantially all of the solvent mixture is in the liquid phase. It is desirable that the bulk of the hydrocarbon solvent mixture enter the formation as a liquid, although this may not be possible initially due to pressure and temperature losses when the solvent first enters the formation.

The normally liquid and normally gaseous materials may be mixed on the surface and introduced via one injection string, or two or more injection strings may be used so the normally liquid and normally gaseous hydrocarbons are injected independently to mix in the formation. Alternatively, separate slugs of the materials may similarly be injected sequentially to mix in the formation. The generally preferred method, however, is to mix the components on the surface, then heat the mixture on the surface or in the injection well, and then introduce the heated liquid phase mixture into the formation by means of a single injection string. The mole ratio of normally gaseous solvent to normally liquid solvent may be from 0.10 to 10 and is preferably from 0.2 to 2.0.

The heating step in the present process may similarly be accomplished in several ways. A conventional heat exchanger may be interposed between the solvent make-up tanks and the well bore, so that the pre-mixed solvents are heated and then introduced into the well. The normally liquid and normally gaseous solvent may be heated separately and then mixed prior to introduction into the formation, or the separately heated solvents may be injected simultaneously by means of two or more injection strings to mix in the formation. Sequential injection of heated normally gaseous and heated normally liquid solvent may similarly be used.

One especially preferred method for introducing this heated multiple component solvent is according to the teachings of U.S. Pat. No. 3,774,684, wherein the fluid heat exchanger is incorporated in the injection well bore. By using this arrangement, the heat loss to the formation can be minimized, and so the fluid entering the formation will be hotter and therefore have a higher bubble point pressure as a result of decreasing heat loss to the formation. Another benefit is the increased safety since solvents such as are used in our process are generally highly combustible and so appropriate safety measures of some kind should be taken. An especially preferred method is to use a steam heated, closed loop downhole heat exchanger.

In applying the process of our invention in a reverse depletion (push-pull) embodiment, wherein the heated solvent mixture is introduced via a well and this well is also used for production of the solvent-petroleum solution, the heated solvent mixture is injected until the maximum penetration of solvent into the petroleum formation has been achieved. The limiting factor in this step is injection pressure and care must always be taken to avoid overpressuring the formation. The hot solvent mixture injection pressure must be sufficiently high so that the mixture is essentially all liquid, and yet the injection pressure should not be so high that fracturing of the overburden will occur. As a general rule of thumb, overburden fracturing will be avoided if the injection pressure is kept below a value in pounds per square inch numerically equal to the overburden thickness expressed in feet. This limitation applies only to the solvent, however. If the closed loop, downhole heat exchanger using steam is employed, the steam pressure is not so limited since it is isolated from the solvent.

As the hot solvent mixture is injected into the well it spreads radially outward from the injection well and dissolves into viscous petroleum. The volume flow rate will ordinarily decrease with time if the injection pressure is held constant. Once the injection flow rate has decreased to a comparatively low value, for example in the range of 10% of the initial flow rate, at the upper limit of injection pressure as defined by the overburden thickness rule stated above, the first step is completed. Solvent injection is then terminated and the pressure in the formation adjacent to the well is reduced to permit petroleum to flow into the well. Reduction in pressure below the bubble point pressure of the solvent-bitumen solution causes the gaseous solvent to break out of solution. As the gaseous hydrocarbon solvent changes from liquid phase to gaseous phase, a large volume increase occurs. This expansion of the normally gaseous hydrocarbon solvent furnishes the driving force necessary to force the solution of bitumen and normally liquid hydrocarbon solvent to move toward the well and then to the surface of the earth.

By heating the solvent mixture the bubble point pressure is increased, which increases the work which can be done by vaporization and gas expansion. As a consequence of this, the solution gas drive extent and effectiveness is increased. As an example, the bubble point pressure of a mixture consisting of 27 mole percent propane and 73 mole percent pentane is 43 psia (pounds per square inch absolute) at 74° F. and is increased to 311 psia by heating the mixture to 300° F.

In addition to increasing the bubble point of the solvent combination, heating and injecting the solvent is an effective method for heating the formation and viscous petroleum so as to achieve a reduction in petroleum viscosity. The enthalpies and final formation and oil temperatures for a formation having 35% porosity being contacted by 2 pore volumes of a 27 mole percent propane, 73 mole percent pentane solvent combination at 300 psia for various solvent temperatures are given below.

TABLE I

| Solvent T (Temperature) °F. | Solvent Enthalpy (BTU/pound) | Formation Temperature Increase ΔT °F. | Formation Temperature °F. |
| --- | --- | --- | --- |
| 74 | 291 | 0 | 74 |
| 300 | 380 | 56 | 130 |
| 600 | 578 | 170 | 244 |
| 900 | 797 | 318 | 392 |

Substantially greater formation heating effect can be achieved using hot solvent than steam at the same pressure since higher temperatures can be achieved at a given pressure, if desired, by varying the hydrocarbon solvent composition.

The above description of the mechanism thought to be responsible for oil production describes the reason for the necessity that one component of the solvent mixture be normally gaseous and the other component normally liquid, and that the heated mixture be injected under sufficient pressure to insure that the mixture be essentially all liquid. The driving force responsible for moving viscous petroleum toward the well is realized only when the normally gaseous component vaporizes, or changes state from a liquid to a gas, at a point some distance from the well from which production is to be taken. Only if the phase change can create a pressure differential between the point of expansion and the well bore can viscous petroleum be moved in the direction of the well bore. If the heated hydrocarbon solvent is introduced in gaseous form, no vaporization-related volume expansion and pressure differential can be created.

It can also be seen that the normally liquid hydrocarbon component is essential to the proper functioning of our invention. While vaporization of the normally gaseous solvent furnishes the drive energy to force viscous crude oil to flow, the normally liquid hydrocarbon component of the heated solvent mixture remains liquid as pressure is reduced, thereby reducing the viscosity of the viscous crude sufficiently to insure that it will move when the driving energy is applied to it. A small amount of the normally gaseous solvent will also be dissolved and/or entrained in the bitumen. Very viscous crude which cannot ordinarily be pumped at ambient temperatures will remain liquid and pumpable at atmospheric pressure because of the presence of normally liquid solvent therein.

Production of viscous petroleum according to the above described reverse depletion, (push-pull) embodiment proceeds for a period of time, with production flow rate declining as the extent of vaporization of the normally gaseous hydrocarbon solvent material increases. After the gas-oil ratio increases to an objectionable value, e.g., around 3000 standard cubic feet of gas per barrel of oil, another cycle of heated multiple-component solvent injection-pressurization followed by production of a solution of petroleum and normally liquid hydrocarbon solvent is initiated. Many cycles of injection-production may be utilized, although the efficiency of this process necessarily decreases with time since the zone of petroleum depletion around the well increases, and this zone must be saturated with solvent in order to penetrate sufficiently far into the formation to provide contact with additional formation petroleum.

The recovery efficiency of this process can be increased in the later stages by the following procedure. A quantity of the heated, multi-component solvent combination is injected in liquid form as described above, and then an inert, inexpensive fluid such as water or gas is injected into the formation to displace the multi-component solvent away from the well bore and to achieve the desired contact between the solvent and formation petroleum. When the solvent injection phase is completed, pressure reduction again results in vaporization of the normally gaseous hydrocarbon. The vaporizing drive results in movement of viscous petroleum (having the normally liquid hydrocarbon component of the solvent mixture dissolved therein) toward the well. The petroleum-solvent solution forces the inert drive fluid, water or gas, toward the well. The inert fluid is produced first, followed by the petroleum-solvent solution. Some comingling usually results, but this is not detrimental to the process. The inert fluid must be separated from the produced solution of viscous petroleum and solvent, although this is accomplished easily. Separation of water can be accomplished easily in a gravity settling tank, and gas separation will occur spontaneously as the pressure is reduced to atmospheric.

Solvent recovery and recycling will normally be desirable in order to reduce the total inventory of solvent required. The normally gaseous hydrocarbon can be removed from the produced petroleum-solvent solution by reducing the pressure. Much of the gas will have broken out of solution in the production phase, and it is only necessary to provide a closed system to capture this gas for reuse. A compressor will ordinarily be needed to raise the pressure of the normally gaseous hydrocarbon solvent in order to condense this material into a liquid for reinjection into the formation.

Separation of the normally liquid hydrocarbon solvent may be accomplished by thermal distillation such as by a coke still. If the viscous petroleum is to be subjected to some form of cracking in a processing unit located some distance from the production point, all or a portion of the normally liquid hydrocarbon solvent may be allowed to remain in the viscous crude to facilitate transportation thereof in a pipeline to the cracking unit. This is especially true in the instance of applying this process to tar sands, since bitumen is much too viscous to pump in its natural form.

When a coke still is used for on site processing of bitumen or other viscous petroleum, substantial amounts of hydrocarbons in the molecular weight range needed for both the normally gaseous hydrocarbon solvent and the normally liquid hydrocarbon solvent are produced. Since the quantity of both types of solvent will increase with time due to the increase in swept volume, it is very advantageous to obtain the desired solvent materials from the coke still.

In another embodiment of the process of our invention, the above described heated, multi-component solvent mixture is used in a multi-well throughput or forward depletion process. In such a process, at least one injection well and at least one production well are used. The heated, multi-component solvent is injected into the injection well or wells and production is taken from the production well or wells. The injection pressure is similarly high enough to insure that the solvent is essentially all liquid in the production well and the portion of the petroleum formation immediately adjacent thereto. The pressure in the formation adjacent to the production well will normally be near atmospheric pressure, so there will be a positive pressure gradient from the injection well to the production well, and at some intermediate point in the formation the pressure is below the vapor pressure of the normally gaseous hydrocarbon solvent. The normally gaseous solvent will vaporize at this point, providing the volume expansion needed to displace petroleum toward the production well.

It is sometimes desirable to use a combination of push-pull and throughput processes for certain applications. In formations having very low fluid transmissivity and/or extremely viscous petroleum, throughput or forward depletion may be difficult or impossible initially. Even if many wells are drilled into such formations the first phase will involve push-pull operations, with injection of hot, multiple-component solvent into each well and subsequent production of petroleum and solvent from each well, although of course, it is not necessary that each phase occur in all wells simultaneously. After several push-pull cycles, conversion to throughput, forward depletion process is undertaken. This is accomplished by converting a portion of the wells to continuous injection wells and a portion to continuous production wells. In a large field the arrangement of injection-production wells may be such as to achieve line drive or to any of several well known patterns such as the five-spot or six-spot pattern, etc. Several advantages result from this two step process. Cessation of push-pull operations occurs when push-pull is becoming inefficient because greater quantities of heated, multiple-component solvent are required because it is penetrating deeper into the formation. Furthermore, the petroleum recovered from the formation during push-pull operations increases the formation transmissivity so that throughput operations is made more practicable than it was prior to push-pull recovery.

If throughput recovery is undertaken and plugging does occur, the injection pressure should be reduced to initiate reverse depletion, which effectively removes the block and permits resumption of throughput or forward depletion.

Solvent recovery and recycling will be accomplished in the same manner as was described in the section dealing with the push-pull recovery embodiment.

Ordinarily a slug of the hot, multi-component solvent is injected into the formation in the throughput process, the slug being followed by an inexpensive drive fluid such as water. From about 5 to about 50 pore volume percent is generally a sufficient volume of solvent. The water injected behind the solvent may contain a minor but effective amount of a viscosity increasing additive such as polyacrylamide or other hydrophilic colloidal polymers, in order to achieve a favorable mobility ratio to insure efficient displacement of the solvent slug by the aqueous drive fluid.

II. The Normally Liquid Solvent

Any material capable of dissolving the viscous petroleum or bituminous petroleum contained in the formation to which the process to be applied, resulting in the formation of a single (liquid) phase solution of solvent and bitumen having a viscosity substantially less than the viscosity of virgin bitumen, which material is normally a liquid at 75° F. and atmospheric pressure, may be used as the normally liquid solvent in our process.

Paraffinic hydrocarbons, specifically linear or branched paraffinic hydrocarbons having from 5 to 10 carbon atoms are suitable materials for use as the normally liquid solvent for practicing the process of our invention. For example, pentane, hexane, heptane, octane, etc. and mixtures thereof as well as commercial blends such as natural gasoline and naphtha will function as a satisfactory normally liquid solvent in many viscous petroleum-containing formations.

Mononuclear aromatic hydrocarbons, especially benzene, toluene, xylene, or other substituted benzene materials, as well as multiple ring aromatic compounds such as naphthalene are excellent solvents for use in our process. Economics will generally dictate that only the simpler compounds such as benzene, toluene or xylene, and mixtures thereof, will be used. Mixed aromatic solvents are frequently available from processing streams of refineries which contain a mixture of benzene, toluene, xylene, and substantial amounts of paraffinic materials such as propane or butane. Such materials are economical solvents and frequently the materials are very satisfactory. This can best be determined by simple tests utilizing the solvent under consideration and a sample of crude petroleum from the formation.

Mixtures of any two or more of the above described compounds may also be used as the normally liquid solvent in the practice of the process of our invention.

III. The Normally Gaseous Solvent

Any hydrocarbon solvent which is gaseous at 75° F. and atmospheric pressure may be used as the normally gaseous solvent in the process of our invention. Low molecular weight paraffinic hydrocarbons such as methane, ethane, propane and butane as well as olefinic hydrocarbons such as ethylene, propylene, or butylene are preferred materials. Mixtures of any two or more of these gaseous hydrocarbon solvents may also be used.

The ratio of normally gaseous solvent to the normally liquid solvent may vary over a fairly broad range and to some extent the preferred concentrations for any particular application will depend on the viscosity of the in place petroleum and other factors. Greater petroleum viscosity reduction is achieved by using larger concentrations of normally liquid solvent, whereas the greater degree of solution gas drive effect results from using a greater quantity of the normally gaseous solvent.

IV. Field Example

In order to better understand the process of our invention, the following pilot field example is offered as an illustrative embodiment of our invention; however, it is not meant to be limitative or restrictive thereof.

A tar sand deposit is located at a depth of 450 feet and the thickness of the deposit is 70 feet. Since the ratio of overburden thickness to tar sand deposit thickness is considerably greater than one, the deposit is not economically suitable for strip mining. It is determined that the most attractive method of exploiting this particular reservoir is by means of solvent or miscible flooding.

A commercial grade propane is available at an attractive price in the area, the composition of this material being 90% propane, 8% ethane, and 2% methane. This material is gaseous at atmospheric pressure and 75° F., so it is quite suitable for use as the normally gaseous solvent. Natural gasoline, which is 65% pentane and the balance hexane through decane, is also available from a local refinery at an attractive price. A mixture comprising 25 mole percent crude propane and 75 mole percent natural gasoline is used as the injected multi-component solvent. This combination will be liquid at any pressure above about 33 pounds per square inch at 75° F. By heating this mixture to 250° F. The bubble point pressure is raised to 326 pounds per square inch absolute.

The above described heated mixture is injected into each of two wells drilled into and completed in the tar sand formation, the wells being approximately 75 feet apart. The injection pressure is 350 pounds per square inch pressure. The criteria for injection pressure are (1) the pressure must be sufficiently high to insure that the hot multi-component solvent combination enters the formation in the liquid phase, and (2) the pressure must not be so high that lifting or fracturing of the overburden results. As a general rule, overburden fractures can be avoided by maintaining the injection pressure expressed in pounds per square inch below a value numerically equal to the overburden thickness expressed in feet. In this case, the multi-component solvent combination is introduced into the formation at a pressure of 350 pounds per square inch, so the hole solvent combination enters the formation as a liquid. Injection of heated solvent continues until the flow rate at 350 psi injection pressure declines materially. Solvent injection is then terminated and the pressure in each well bore is reduced to atmospheric pressure. A solution of bitumen and normally liquid solvent flows from the formation into both well bores and therethrough to the surface of the earth. Reduction in pressure causes the normally gaseous solvent to break out of solution and vaporize, forcing the solution of bitumen and normally liquid solvent to move back toward the well bores. Since the bubble point pressure of the hot solvent mixture is 326 psia, vaporization of the normally gaseous solvents occurs at a high pressure, and the volume expansion resulting from vaporization is capable of doing greater work in driving oil toward the producing well than would the same mixture at a lower temperature. Presence of the normally liquid solvent in the bitumen maintains the bitumen in a liquid state with sufficiently low viscosity that it can be pumped. When essentially all of the normally gaseous solvent has vaporized the driving force is depleted and the production rate declines fairly sharply. Once the production rate has declined to a fairly low, stable value, another cycle of multi-component solvent injection followed by a production cycle as described above is performed in each well. Numerous cycles of multi-component solvent injection and production are performed until the recovery efficienty (barrels of bitumen recovered per barrels of solvent used) declines to a very low figure.

After both wells have been exploited by seven push-pull heated solvent injection and recovery cycles, the pilot is converted to a through put forward depletion operation. The wells are 75 feet apart, and the area swept by the injected solvent is determined by laboratory modeling to be 3000 square feet. Since the porosity of the formation is 18 percent and the vertical conformance is estimated to be 50%, the swept volume will be $(0.18) \times (0.50) \times (3000) \times (70)$ or 18900 cubic feet. Nitrogen is injected through the formation for two days to establish initial communication. A 10 pore volume percent slug of solvent, or 1890 cubic (14137 gallon) slug of the same multi-component solvent combination used in the push-pull reverse depletion phase of the program is heated to 250° F. and injected into one well and displaced through the formation by injecting water into the injection well toward the production well. The injection pressure is maintained at 350 pounds per square inch absolute. Since the formation pressure near the well bore is only slightly above atmospheric pressure, there is necessarily a point between the injection well and production well where the normally gaseous hydrocarbon solvent vaporizes to drive the bitumen toward the production well. Since the zone adjacent the production well has been partially depleted during the push-pull phase, no plugging problems are encountered. Injection of water into the injection well is continued until the solvent has been essentially fully recovered and water breaks through into the production well. Steam is injected into the formation near the end of the program to aid in recovering solvent from the formation for reuse or resale.

Solvent recovery from produced petroleum and recycling is used in all phase of this project in order to reduce the quantity of solvent required.

Our invention has been illustratively described in terms of a number of specific embodiments, although it is not so limited since many other variations of the process described herein will be apparent to persons skilled in the related art without departing from the true spirit and scope of our invention. Also, several mechanisms have been disclosed to explain the benefits resulting from application of the process of our invention, although it is not hereby represented that these are the only or even the principal mechanisms responsible for the improved benefits achieved by application of our process. It is our intention that our invention be limited and restricted only by those restrictions and limitations as are included in the claims appended hereinafter below.

We claim:

1. A method for recovering viscous petroleum including bitumen from subterranean, viscous petroleum containing formations including tar sand deposits, the formation being penetrated by at least one well in fluid communication therewith comprising:

a. injecting a normally gaseous hydrocarbon solvent heated to a temperature from about 100° F to a value less than the boiling temperature of the normally gaseous solvent at the injection pressure and greater than ambient temperature into the formation at a pressure at which the heated normally gaseous solvent is essentially all in the liquid phase;

b. injecting a normally liquid hydrocarbon solvent heated to a temperature from about 100° F to a value less than the boiling temperature of the normally liquid solvent at the injection pressure and greater than ambient temperature into the formation at a pressure at which the heated normally liquid solvent is essentially all in the liquid phase, said normally liquid solvent being selected from the group consisting of paraffinic hydrocarbons having from five to ten carbon atoms, mononuclear aromatic hydrocarbons, naphtha, natural gasoline, and mixture thereof;

c. reducing the pressure in at least a portion of the petroleum formation contacted by the solvents to a value at which the normally gaseous solvent will be at least partly in the gaseous phase; and e. recovering a solution of the petroleum and the injected normally liquid solvent from the formation.

2. A method as recited in claim 1 wherein the normally gaseous solvent and normally liquid solvent are injected simultaneously into the formation via separate flow paths.

3. A method as recited in claim 1 wherein the normally gaseous solvent and normally liquid solvent are injected sequentially into the formation.

4. A method as recited in claim 1 wherein the normally gaseous solvent is selected from the group consisting of paraffinic hydrocarbons having from one to four carbon atoms and olefinic hydrocarbons having from two to four carbon atoms and mixtures thereof.

5. A method as recited in claim 4 wherein the normally gaseous hydrocarbon solvent is predominantly propane.

6. A method as recited in claim 1 wherein the normally liquid hydrocarbon is pentane.

7. A method as recited in claim 1 wherein the normally liquid hydrocarbon is natural gasoline.

8. A method as recited in claim 1 wherein the mole ratio of normally gaseous solvent to normally liquid solvent is from about 0.10 to about 10.

9. A method as recited in claim 1 wherein the petroleum is produced via the same well as is used for injecting heated solvent into the formation.

10. A method as recited in claim 9 wherein more than one cycle of normally gaseous heated solvent and normally liquid heated solvent injection and petroleum production are performed.

11. A method as recited in claim 1 wherein the formation is penetrated by at least two spaced apart wells in fluid communication therewith and the heated solvents are introduced into at least one of said wells and production of petroleum is taken from at least one of said other spaced apart wells.

12. A method as recited in claim 1 wherein the formation is penetrated by at least two wells in fluid communication therewith and said heated solvents are injected into and reverse petroleum production is accomplished in at least two of said wells until recovery efficiency drops to a preselected value, after which heated, multi-component solvents are introduced into at least one of said wells and forward production is taken from at least one of said remotely located wells.

13. A method as recited in claim 1 wherein the formation is penetrated by at least two wells in fluid communication therewith and said heated solvents are injected into at least one of said wells and forward production taken from at least one of said remotely located wells until plugging in the formation is observed, at which time the pressure is reduced in said injection well to permit reverse production of petroleum therefrom.

14. A method as recited in claim 1 wherein an inert fluid including water is introduced into the formation after introduction of a predetermined quantity of solvents thereinto to displace the solvents away from the well.

15. A method as recited in claim 1 wherein at least some of the solvent introduced into the formation is removed from the produced petroleum-solvent solution for re-injection into the formation.

16. A method as recited in claim 1 comprising the additional step of introducing a heated fluid into the formation to recover hydrocarbons therefrom.

17. A method as recited in claim 16 wherein the heated fluid is selected from the group consisting of steam, hot water and mixtures thereof.

18. A method as recited in claim 1 wherein the pressure expressed in pounds per square inch at which the heated solvents are introduced is numerically less than the depth of the petroleum formation expressed in feet.

19. A process as recited in claim 1 wherein alternating cycles of heated, multiple solvent injection and water injection are performed and forward production is taken from the formation.

20. A method as recited in claim 1 wherein the solvents are recovered after completion of oil recovery operations by injecting an inert gaseous material into the formation.

21. A method as recited in claim 1 wherein the solvents are heated to a temperature from about 100° F to about 500° F.

* * * * *